United States Patent
Nagel et al.

(10) Patent No.: US 7,918,942 B2
(45) Date of Patent: Apr. 5, 2011

(54) DRAIN VALVE FOR A DISHWASHER AND ASSOCIATED APPARATUS AND METHOD

(75) Inventors: Douglas J. Nagel, Kinston, NC (US); Jason Duckworth, Kinston, NC (US); James Burrows, Winterville, NC (US)

(73) Assignee: Electrolux Home Products, Inc., Cleveland, OH (US)

( * ) Notice: Subject to any disclaimer, the term of this patent is extended or adjusted under 35 U.S.C. 154(b) by 510 days.

(21) Appl. No.: 12/025,237

(22) Filed: Feb. 4, 2008

(65) Prior Publication Data

US 2009/0194141 A1 Aug. 6, 2009

(51) Int. Cl.
*B08B 3/02* (2006.01)

(52) U.S. Cl. .................. 134/25.2; 134/34; 134/186

(58) Field of Classification Search .................. 134/186, 134/57 D, 56 D, 58 D
See application file for complete search history.

(56) References Cited

U.S. PATENT DOCUMENTS

| | | | | |
|---|---|---|---|---|
| 2,692,602 | A | * | 10/1954 | Stanitz et al. ............ 134/57 D |
| 3,245,652 | A | * | 4/1966 | Roth ..................... 251/129.14 |
| 3,506,030 | A | * | 4/1970 | Vesco ......................... 137/595 |
| 3,578,284 | A | * | 5/1971 | Martini ......................... 251/88 |
| 3,827,671 | A | * | 8/1974 | Bolden et al. ................. 251/84 |
| 3,887,162 | A | * | 6/1975 | Antoni et al. ............ 251/129.07 |
| 4,174,091 | A | | 11/1979 | Donahue, Jr. et al. |
| 4,273,310 | A | * | 6/1981 | Ginzler ........................ 251/211 |
| 4,392,891 | A | | 7/1983 | Meyers |
| 4,848,382 | A | | 7/1989 | Bertsch et al. |
| 5,037,062 | A | * | 8/1991 | Neuhaus ........................ 251/76 |
| 5,320,120 | A | | 6/1994 | Hoffman et al. |
| 6,001,190 | A | * | 12/1999 | El-Shoubary et al. ......... 134/10 |
| 6,149,125 | A | * | 11/2000 | Nilsson ......................... 251/82 |
| 6,182,674 | B1 | | 2/2001 | Jozwiak et al. |
| 6,418,943 | B1 | | 7/2002 | Miller |
| 6,450,196 | B1 | * | 9/2002 | Bartos et al. ................ 137/414 |
| 2004/0163689 | A1 | * | 8/2004 | Lee ............................. 134/94.1 |
| 2005/0077399 | A1 | | 4/2005 | Watson et al. |
| 2006/0181144 | A1 | * | 8/2006 | Ho ............................. 303/119.2 |
| 2006/0237035 | A1 | | 10/2006 | Ferguson et al. |

FOREIGN PATENT DOCUMENTS

| | | |
|---|---|---|
| DE | 1005043027 A1 | 3/2007 |
| FR | 2 336 048 | 8/1977 |
| SU | 457838 * | 4/1975 |

* cited by examiner

*Primary Examiner* — Frankie L Stinson
(74) *Attorney, Agent, or Firm* — Alston & Bird LLP (57) ABSTRACT

A drain valve for a dishwasher and associated apparatus and method are provided. A housing receives fluid through an inlet channel and channels the fluid toward an outlet channel extending from an outlet port defined by the housing. A sealing member is disposed within the housing and is capable of forming a sealing engagement with the outlet port. A cradle member disposed within the housing is configured to receive and partially constrain freedom of movement of the sealing member. The cradle member is movable between a valve closed position, where fluid flow toward the outlet channel urges the sealing member into sealing engagement with the outlet port to close the drain valve, and a valve open position, where fluid flow is allowed between the inlet channel and the outlet channel, through the housing, without the sealing member engaging the outlet port.

29 Claims, 5 Drawing Sheets

DRAIN VALVE FOR A DISHWASHER AND ASSOCIATED APPARATUS AND METHOD

BACKGROUND OF THE INVENTION

1. Field of the Invention

The present disclosure relates to dishwashers and, more particularly, to a drain valve for a dishwasher and associated apparatus and method.

2. Description of Related Art

A dishwasher is typically used to remove food soils and debris from the dishware therein. In doing so, however, various factors such as, for example, water consumption, energy consumption, and the duration of the wash cycle must be considered in determining the effectiveness of the dishwasher. These factors, namely power consumption, water consumption, etc., may be adversely affected by draining and re-filling the dishwasher (i.e., increased water usage, as well as energy usage due to the pump used for draining the water). As such, one area of interest is effective filtration of the wash water, since the water used for washing the dishware is often re-circulated over the dishware. Effective filtration leads to a more effective dishwashing since food soils are not re-circulated back over the dishware. In addition, less draining and re-filling conserves water and energy, and may help to reduce the overall duration of the wash cycle.

Effective filtration, in some instances, is combined with other measures such as, for example, turbidity monitoring and/or circulation pump condition sensing, with the goal of a high quality wash. In or during a typical "pre-wash" or "main wash" cycle segment, the wash water in the tub may be drained and re-filled one or more times so as to remove excessive soils that may degrade the wash quality, if re-circulated in the dishwasher, wherein such excessive soils are determined through, for example, turbidity monitoring and/or condition sensing of the circulation pump.

The circulation pump and the turbidity sensor are typically located with the sump of the dishwasher. In this regard, water entering the sump from the tub is typically subjected to different filtration aspects, such as a glass trap, a coarse filter, and/or a finer filter. As such, provisions are provided for filtering the wash water before the wash water enters the sump to be re-circulated by the circulation pump. However, the circulation pump outlet may also include filtration provisions in communication therewith, such as a soil collection chamber (i.e., a pressurized fine filter), through which a portion of the wash water may be directed for further filtration as the wash water is directed from the circulation pump outlet and through the hydraulic system (spray arms, etc.).

In instances where such filtration provisions are included in communication with the outlet of the circulation pump, situations may arise where such filtration provisions (i.e., the soil collection chamber or "pressurized fine filter") may become clogged or otherwise restricted (i.e., in particularly heavy or extreme soil loads in the dishwasher). Often, this situation would manifest itself in the sensing of the turbidity of the wash water as being above a particular level, or the sensing of a starvation condition of the circulation pump motor. In those situations, the wash water may be at least partially drained (which may evacuate or flush the soil collection chamber or pressurized fine filter), and then clean water used to replaced the drained wash water. However, this may not necessarily resolve the problem of the clogged or restricted pressurized fine filter (i.e., may not remove the material causing the clog or restriction therein). Further, in evacuating or flushing the pressurized fine filter, the flow of the water to do so (i.e., as provided through the lower wash arm) is directed through the filtration surface and into the interior of the pressurized fine filter, and then through the interior of the pressurized fine filter to a drain port thereof leading to the house drain. As such, if the pressurized fine filter remains blocked or clogged, and the circulation pump continues to pump the wash water, all or part of the wash water may be forced out through the pressurized fine filter drain port and into the house drain, leaving the dishwasher in a starvation condition, with no wash water therein. Often, in such situations, the wash water and/or soil/debris/particles in or removed from the soil collection chamber may be particularly harsh, and may require special provisions for handling.

Thus, there exists a need for a drain valve for a dishwasher that is configured to withstand particulate matter in the dishwasher while preventing wash water from exiting the drain pump system when the circulation pump is in operation.

BRIEF SUMMARY OF THE INVENTION

The above and other needs are met by the present disclosure which, in one embodiment, provides a drain valve for a dishwasher. Such a drain valve is adapted to be fluidly disposed along a drain channel between a drain pump and a house drain, and comprises a housing adapted to receive a fluid through an inlet channel and to channel the fluid toward an outlet channel, wherein the outlet channel extends from an outlet port defined by the housing. A sealing member is disposed within the housing, and is configured to be capable of forming a sealing engagement with the outlet port. A cradle member is disposed within the housing and is configured to receive and partially constrain freedom of movement of the sealing member. The cradle member is further configured to be movable within the housing between a valve closed position, where the sealing member is disposed such that fluid flow toward the outlet channel urges the sealing member into sealing engagement with the outlet port to close the drain valve, and a valve open position, where the sealing member is disposed such that fluid flow is allowed between the inlet channel and the outlet channel, through the housing, without the sealing member engaging the outlet port.

Another advantageous aspect of the present invention comprises a washing appliance adapted to communicate with a house drain adapted to receive a fluid from the washing appliance. Such a washing appliance includes a washing compartment in communication with a drain channel extending toward the house drain. A drain valve is fluidly disposed along the drain channel between the washing compartment and the house drain, wherein the drain valve comprises a housing adapted to receive the fluid through an inlet channel and to channel the fluid toward an outlet channel extending from an outlet port defined by the housing. A sealing member is disposed within the housing, and configured to be capable of forming a sealing engagement with the outlet port. A cradle member is disposed within the housing and is configured to receive and partially constrain freedom of movement of the sealing member. The cradle member is further configured to be movable within the housing between a valve closed position, where the sealing member is disposed such that fluid flow toward the outlet channel urges the sealing member into sealing engagement with the outlet port to close the drain valve, and a valve open position, where the sealing member is disposed such that fluid flow is allowed between the inlet channel and the outlet channel, through the housing, without the sealing member engaging the outlet port.

Another advantageous aspect of the present invention comprises a method of controlling drainage from a washing appliance. A fluid is received through an inlet channel extending into a housing of a drain valve, wherein the drain valve is fluidly disposed along a drain channel between a drain pump and a house drain. The fluid is then channeled toward an outlet channel extending from an outlet port defined by the housing. A cradle member disposed within the housing and configured to receive and partially constrain freedom of movement of a sealing member configured to be capable of forming a sealing engagement with the outlet port, is moved between a valve closed position, where the sealing member is disposed such that fluid flow toward the outlet channel urges the sealing member into sealing engagement with the outlet port to close the drain valve, and a valve open position, where the sealing member is disposed such that fluid flow is allowed between the inlet channel and the outlet channel, through the housing, without the sealing member engaging the outlet port.

Thus, the drain valve, washing appliance, and associated method, as disclosed in conjunction with various embodiments of the present disclosure, provide many advantages as disclosed herein.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE INVENTION

The present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout.

A dishwasher typically includes a circulation pump and, in some instances, various sensors in communication with a sump of the dishwasher. In this regard, water entering the sump from a washing compartment (i.e., the dishwasher tub) is typically subjected to different filtration aspects, such as, for example, a glass trap, a coarse filter, and/or a fine filter. As such, provisions are normally provided for filtering the wash water, before the wash water enters the sump to be re-circulated through one or more wash arms by the circulation pump. However, the circulation pump outlet may also include filtration provisions, such as a soil collection chamber (i.e., a pressurized fine filter), through which a portion of the wash water may be directed for further filtration as the wash water is directed from the circulation pump outlet and through the hydraulic system (spray arms, etc.). Such filtration provisions (i.e., the soil collection chamber or "pressurized fine filter") may sometimes become clogged or otherwise restricted (i.e., in particularly heavy or extreme soil loads in the dishwasher). Accordingly, if the circulation pump continues to pump the wash water to the pressurized fine filter, all or part of the wash water may be forced out through the pressurized fine filter drain port and into the house drain, leaving the dishwasher in a starvation condition, with no wash water therein.

Figure 1:
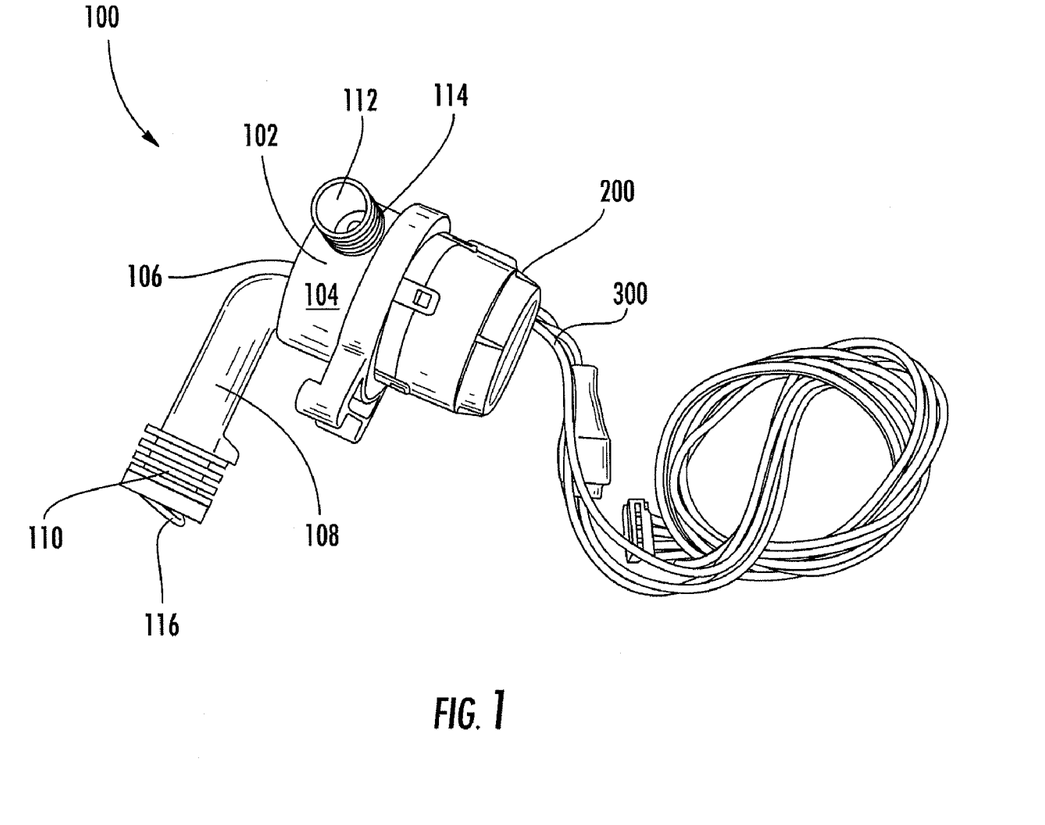
FIG. 1 illustrates a perspective view of a drain valve for a dishwasher according to one embodiment of the present disclosure.

As illustrated in FIG. 1, embodiments of the present invention are thus directed to a drain valve, generally designated 100, for withstanding particulate matter in a dishwasher, as well as preventing the wash water from being forced out of the dishwasher and into the house drain, as the circulation pump is in operation, so as to prevent the starvation condition. In some embodiments, drain valve 100 is disposed in the drain line from the dishwasher, following a drain pump, and leading to the house drain. That is, drain valve 100 may be configured as the last component in the drain line, before the drain line leaves the dishwasher. As such, drain valve 100 is configured to be capable of selectively closing the drain line of the dishwasher such as, for example, when the circulation pump is in operation.

In one embodiment, drain valve 100 is configured to be electrically actuated (i.e., electrically opened and closed), though one skilled in the art will appreciate that such a valve may be actuated in different ways such as, for example, mechanically, hydraulically, or in other appropriate manners. According to one aspect, during dishwasher operation, the drain valve 100 is actuated to a "closed" position, at least while the circulation pump is in operation (or additionally when there is wash water in the dishwasher that is not being drained therefrom), and then actuated to an "open" position when the drain pump is in operation or when some other drain operation is being performed, to permit the wash water to leave the drain system of the dishwasher and enter the house drain. In such a manner, the "closed" drain valve 100 may prevent the wash water from being pumped out of the dishwasher in the event of a clogged or restricted pressurized fine filter, but would allow the wash water to be drained if the drain pump is particularly actuated or a drain operation is otherwise being performed (i.e., such as an evacuation or flush of the pressurized fine filter).

With continuing reference to FIG. 1, drain valve 100 comprises a drain valve housing 102 operably engaged with an actuation mechanism 200, which is configured to operate a valve mechanism within drain valve housing 102. As previously disclosed, for an electrically actuated drain valve 100, an electrical actuation mechanism (or "actuator") 200 may be in operable communication with wiring 300 for receiving power thereto, as well as signaling instructions from the dishwasher's control panel regarding when to actuate the valve mechanism between the open and closed positions.

In some embodiments, drain valve housing 102 may be substantially cylindrically shaped to include a circumferential side wall 104. In addition, drain valve housing 102 may have a substantially planar top wall 106 with an outlet channel 108 extending from an outlet port 126 defined by the top wall 106. In some instance, the outlet channel 108 may include a bend portion as the outlet channel 108 extends toward a threaded end 110. Further, an inlet channel 112 may extend from circumferential side wall 104 of drain valve housing 102 toward a threaded end 114. Threaded ends 110, 114 may be provided, for example, for connecting outlet channel 108 and inlet channel 112 to respective portions of the drain system. One skilled in the art will appreciate, however, that the drain valve housing 102 may be configured in many different manners according to the operational principles of drain valve 100 disclosed herein.

An anti-backflow device 116 such as, for example, a flapper valve, a ball valve, or any other suitable one-way flow mechanism, may be included at or about threaded end 110 of outlet channel 108 to prevent backflow of used or otherwise contaminated water back into the dishwasher from the house drain. That is, anti-backflow device 116 may be configured to allow the wash water to exit outlet channel 108 during a drain procedure, while also being configured to prevent waste water from entering outlet channel 108 (i.e., backflowing into drain valve 100) from the house drain. For example, flapper valve 116 may be pivotably attached to threaded end 110 and biased thereagainst to "close" outlet 108 such that wash water exiting outlet channel 108 forces flapper valve 116 to "open" and allow water to flow out of outlet channel 108 into the house drain. Once the wash water is no longer flowing from outlet channel 108, flapper valve 116 is biased to close and prevent the wash water from backflowing into drain valve 100. To that end, in such instances, threaded end 110 is configured to prevent flapper valve 116 from pivoting to a position inside outlet channel 108 by, for example, a flange (not shown).

Figure 2:
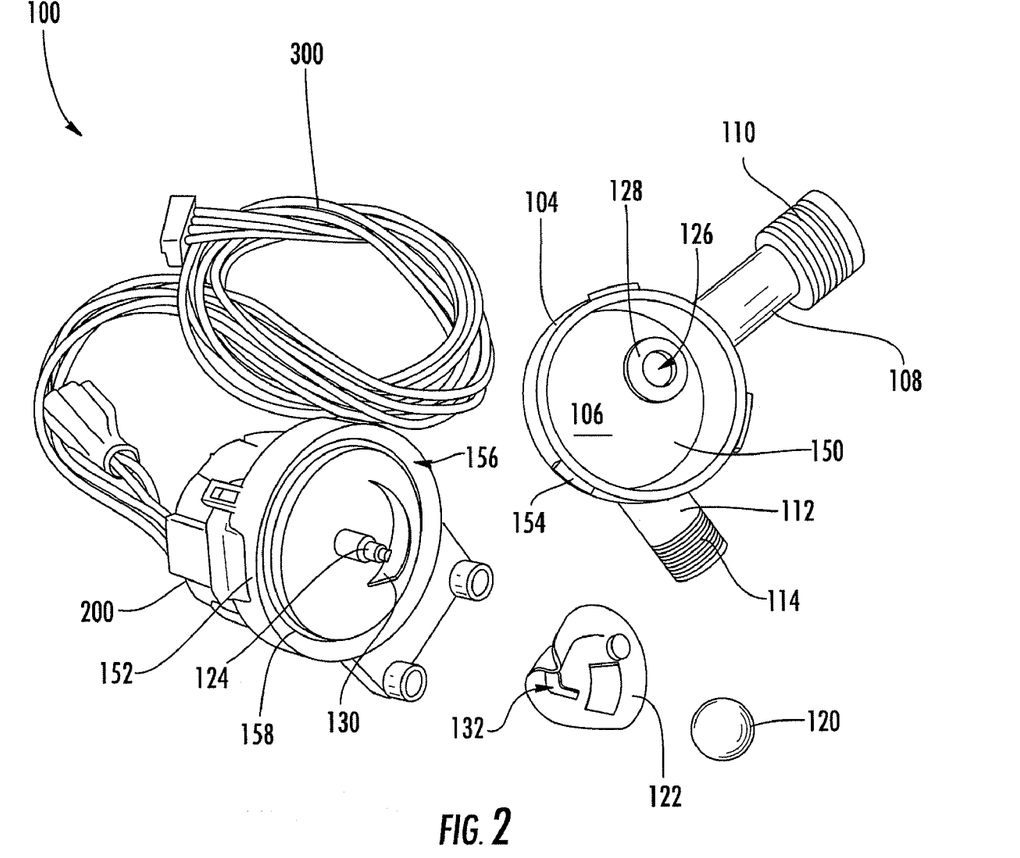
FIG. 2 illustrates an exploded view of a drain valve according to one embodiment of the present disclosure.

Drain valve 100 is configured to be selectively actuated between a valve-closed and a valve-open position so as to control the egress of the wash water from the dishwasher via the drain valve 100 and into the house drain. As shown in FIG. 2, in some embodiments, drain valve housing 102 may comprise an upper portion 150 and a lower portion 152, which are configured to cooperate and to be operably engaged so as to house a valve mechanism effectuating the valve-closed and valve-open conditions of drain valve 100. In some instances, upper portion 150 may include a plurality of tab portions 154 that complementarily configured with respect to a channel, generally designated 156, defined by lower portion 152. As such, tab portions 154 may fit within channel 156 to permit rotation of upper portion 150 with respect to lower portion 152 so as to rotatably lock upper portion 150 to lower portion 152. Furthermore, a seal 158 may be provided and positioned between upper portion 150 and lower portion 152 to from a watertight seal therebetween.

With further reference to FIG. 2, according to some embodiments, the valve mechanism may generally comprise a sealing member 120 and a cradle member 122 disposed within drain valve housing 102. The sealing member 120 is configured to be received by the cradle member 122, whereby the cradle member 122 is configured to partially constrain freedom of movement of the sealing member 120 with respect thereto (see, e.g., FIGS. 3 and 5, where upper portion 150 of drain valve housing 102 has been removed to better illustrate the operation of sealing member 120 and cradle member 122). In some instances, the cradle member 122 may cooperate with other components such as, for example, the circumferential side wall 104 and/or top wall 106 of drain valve housing 102 to partially constrain freedom of movement of the sealing member 120. In one instance, sealing member 120 may be received within cradle member 122, wherein cradle member 122 is, in turn, connected to a rotatable shaft 124. Rotatable shaft 124 may be operated by an actuator, such as, for example, actuation mechanism 200, such that the shaft 124 rotates about an axis defined thereby.

Figure 4:
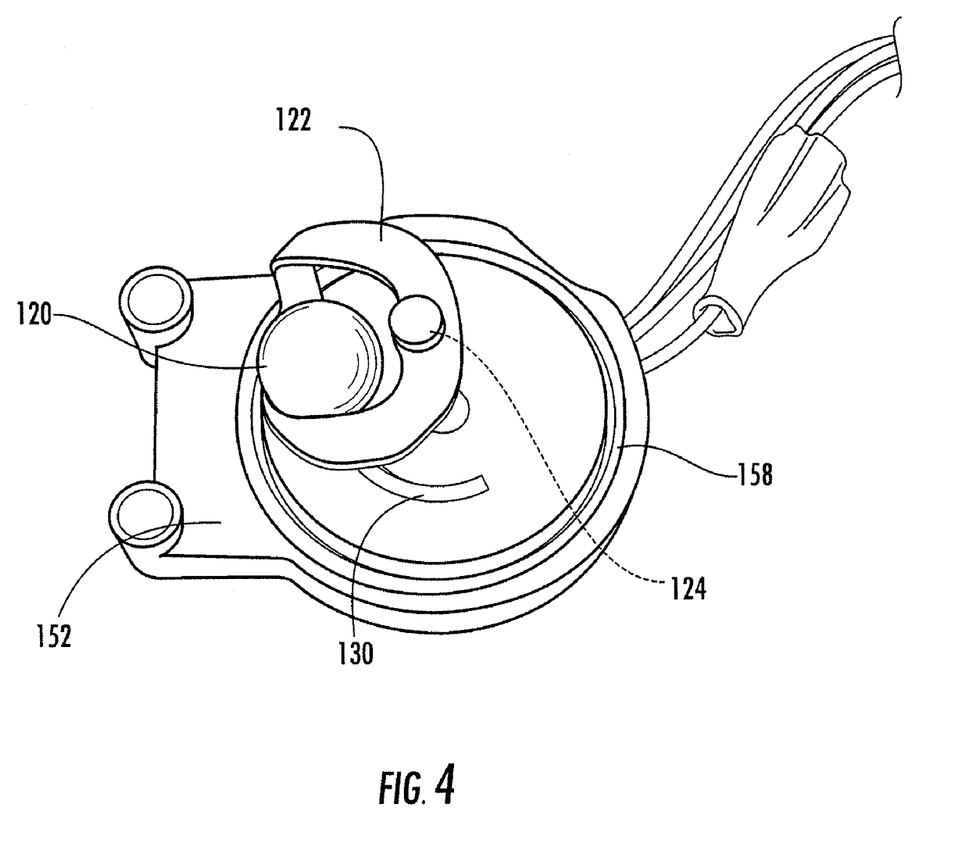
FIG. 4 illustrates a perspective view of an upper portion of a housing for a drain valve according to one embodiment of the present disclosure, wherein a sealing member is engaged with an outlet port defined by the upper portion.

Thus, when the valve mechanism is actuated to the "closed" position, the actuator 200 rotates cradle structure 122 via shaft 124 into a position such that sealing member 120 is urged and directed by fluid (wash water) flow, through the inlet channel 112 and into drain valve housing 102, such that the sealing member 120 interacts with and sealingly engages the outlet port 126 of the upper portion 150 of drain valve housing 102 leading to outlet channel 108 (see, e.g., FIG. 4). In this matter, a fluid-tight sealing engagement may be formed between the sealing member 120 and the outlet port 126 to effectively "close" the drain valve 100. Further, in some instances, an outlet port seal 128 may be operably engaged with the housing 102 so as to, for example, extend about the outlet port 126. In such instances, engagement between the outlet port seal 128 and the sealing member 120, with the valve mechanism in the "closed" position, forms a substantially fluid-tight sealing engagement for effectively closing the drain valve 100 with respect to fluid flow.

When the valve mechanism is actuated to the "open" position, the actuator 200 rotates cradle structure 122 via the shaft 124 to move sealing member 120 away from the outlet port 126 so as to undo the sealing engagement therebetween to effectively "open" the drain valve 100. In some instances, the valve mechanism in the valve-open position allows any water directed through drain valve housing 102 to flow between the inlet channel 112 and into the outlet channel 108 via the outlet port 126. In one aspect, when the valve mechanism is moved to the "closed" position, the sealing member 120 is moved by the cradle member 122 to a position within drain valve housing 102 whereby the sealing member 120 is only capable of interacting with top wall 106, away from outlet port 126. Accordingly, any wash water and/or particulate media entering inlet channel 112 may flow through to the outlet channel 108 and into the house drain unimpeded by the sealing member 120.

One skilled in the art will appreciate, however, that though the drain valve 100 disclosed herein is described in terms of a generally cylindrical housing 102 having a flat top 106 defining the outlet port 126 to the outlet channel 108, that other configurations of the drain valve are also considered to be within the scope of the present disclosure whereby, in the valve closed position, cradle structure 122 is movable into a position such that sealing member 120 is urged and directed by fluid (wash water) flow, through the inlet channel 112 and into drain valve housing 102, such that the sealing member 120 interacts with and sealingly engages the outlet port 126 of drain valve housing 102 leading to outlet channel 108, so as to form a fluid-tight sealing engagement between the sealing member 120 and the outlet port 126 to effectively "close" the drain valve 100.

In one aspect of the present invention, the outlet port 126 may be defined by a horizontally-disposed surface of the upper portion 150 of the drain valve housing 102. In conjunction with such a configuration, the sealing member 120 may further be configured to be buoyant. Accordingly, when the cradle member 122 is actuated to the valve closed position, the sealing member 120 becomes disposed below the outlet port 126 such that fluid flow toward the outlet channel 108 buoys the sealing member 120 into sealing engagement with the outlet port 126 to effectively close the drain valve 100 (see, e.g., FIG. 4). Further, when actuated to the valve open position, the sealing member 120 is moved by the cradle member 122 such that the sealing member 120 is not disposed below the outlet port 126. In such instances, fluid flow is allowed between the inlet channel 112 and the outlet channel 108 through the housing 102, unimpeded by the sealing member 120. In such instances, the sealing member 120 may comprise a durable, buoyant material such as, for example, a plastic material, for withstanding harsh particulates. Generally, the sealing member 120 may be comprised of at least one of an abrasion-resistant material, non-stick material, a buoyant material, and combinations thereof.

Figure 3:
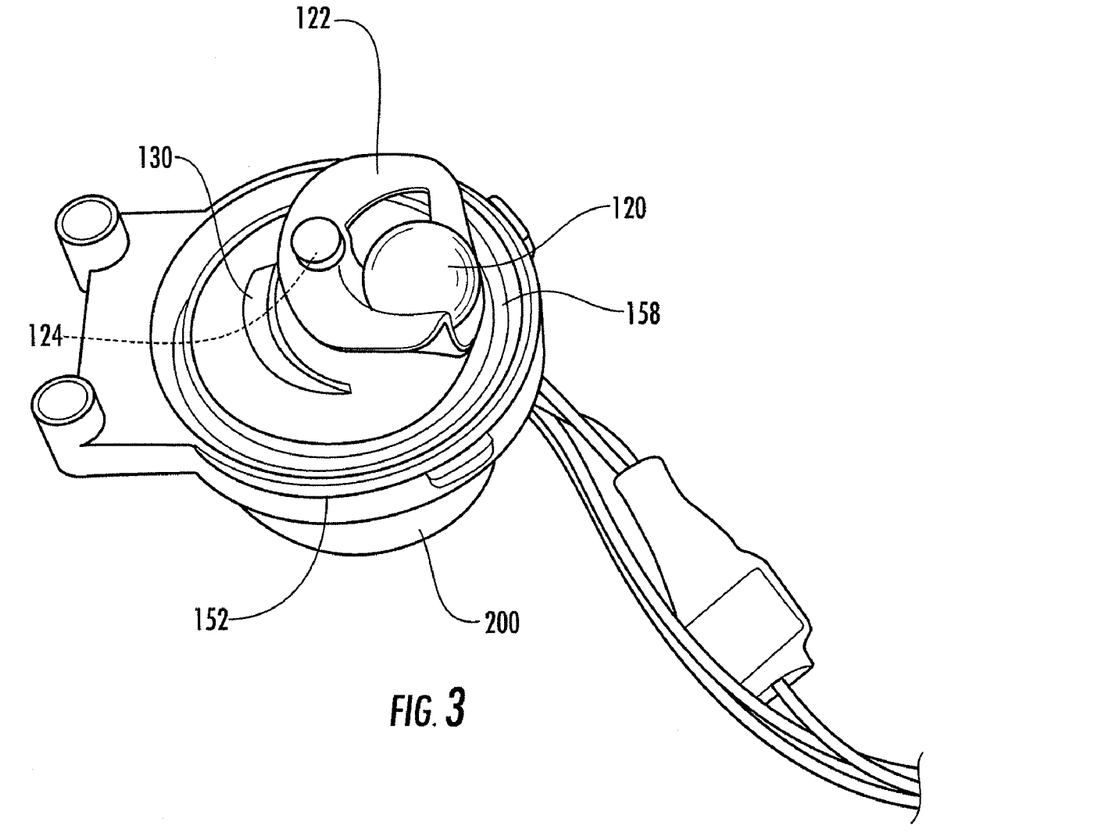
FIG. 3 illustrates a perspective view of a cradle member for a drain valve according to one embodiment of the present disclosure, the cradle member being rotated to a valve open position to allow water to flow through the drain valve.
Figure 5:
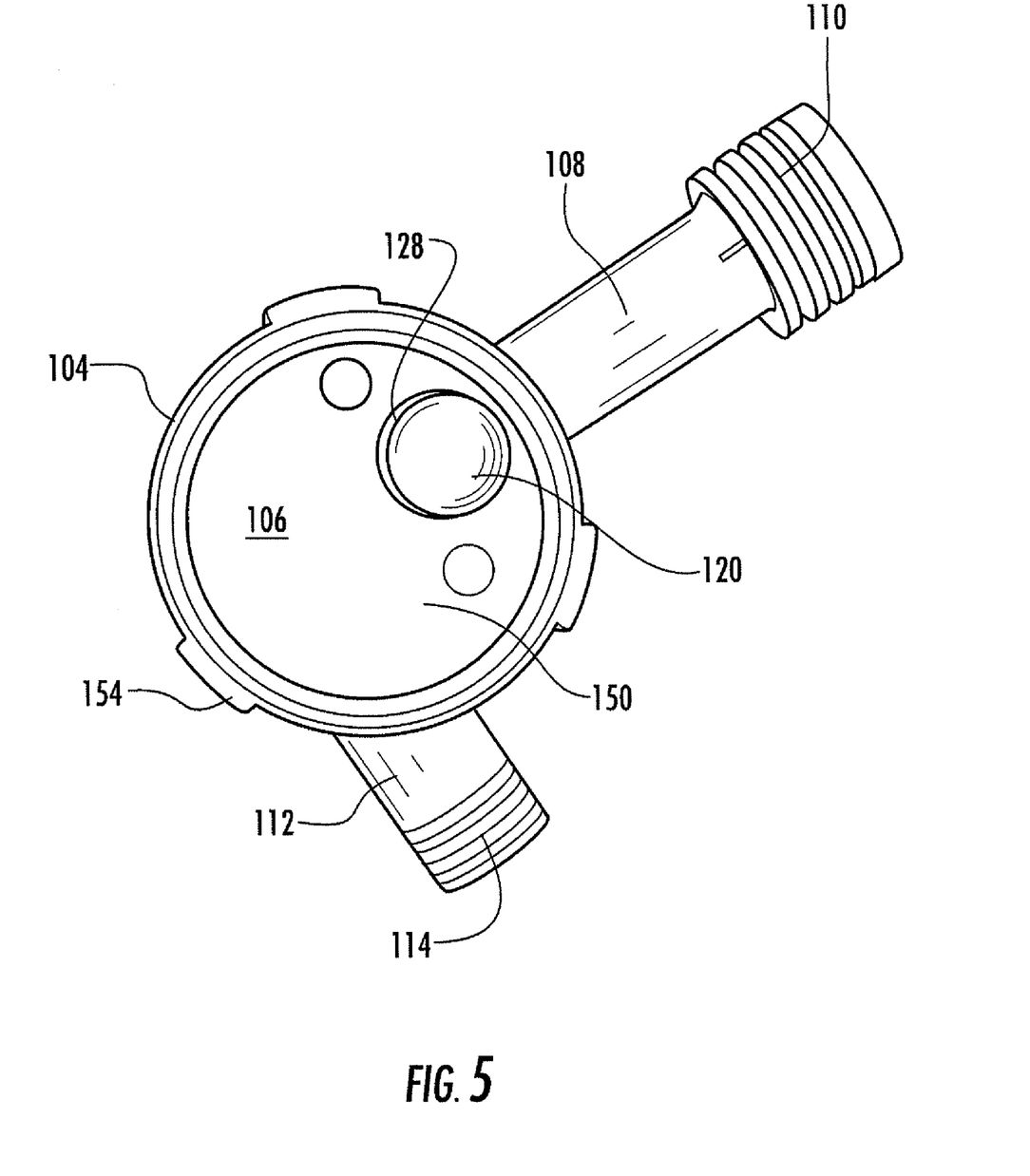
FIG. 5 illustrates a perspective view of a cradle member for a drain valve according to one embodiment of the present disclosure, the cradle member being rotated to a valve closed position to prevent water from flowing through the drain valve.

As shown in FIGS. 3 and 5, in some embodiments, the drain valve 100 may further include a directing element 130 configured to engage the sealing member 120, as the sealing member 120 is moved by the cradle member 122 toward the valve closed position, so as to direct the sealing member 120 toward the outlet port 126 for facilitating engagement therebetween so as to effectuate the valve-closed condition. In some circumstances, the directing member 130 may be configured to provide sufficient force for urging the sealing member 120 into engagement with the outlet port 126 to close the drain valve 100, instead of the drain valve 100 being closed as a result of fluid flow urging the sealing member 120 toward the outlet port 126. In still other instances, the cradle member 122 may be configured to define a slot 132 configured to receive the directing element 130, as the cradle member 122 moves the sealing member 120 toward the valve closed position, so as to allow the directing element 130 to engage the sealing member 120. According to one aspect, such a mechanism (i.e., directing element 130 and slot 132) may be implemented to minimize the risk of sealing member 120 sticking to cradle member 122.

Advantageously, embodiments of the drain valve 100, as disclosed herein, may provide good or improved resistance to particulate or otherwise abrasive media, which may otherwise shorten the service life of a diaphragm-type valve or other valve with a less robust valve structure.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A drain valve for a dishwasher, the drain valve being adapted to be fluidly disposed along a drain channel between a drain pump and a house drain, the drain valve comprising:
   a housing adapted to receive a fluid through an inlet channel and to channel the fluid toward an outlet channel, and the outlet channel extending from an outlet port defined by the housing;
   a sealing member disposed within the housing, the sealing member being configured to be capable of forming a sealing engagement with the outlet port; and
   a cradle member disposed within the housing and configured to receive and partially constrain freedom of movement of the sealing member, the cradle member being further configured to be rotatable within the housing between a valve closed position, where the sealing member is moved by the cradle member to a position such that fluid flow toward the outlet channel urges the sealing member into sealing engagement with the outlet port to close the drain valve, and a valve open position, where the sealing member is moved by the cradle member away from, and out of sealing engagement with, the outlet port such that fluid flow is allowed between the inlet channel and the outlet channel, through the housing, without the sealing member engaging the outlet port.

2. A drain valve according to claim 1, wherein the outlet port is defined by a horizontally-disposed surface of the housing the sealing member is configured to be buoyant, and the cradle member is configured such that, in the valve closed position, the sealing member is disposed below the outlet port such that fluid flow toward the outlet channel buoys the sealing member into sealing engagement with the outlet port to close the drain valve and, in the valve open position, the sealing member is not disposed below the outlet port such that fluid flow is allowed between the inlet channel and the outlet channel through the housing.

3. A drain valve according to claim 1, further comprising a shaft member extending into the housing and configured to be rotated by an actuator operably engaged therewith, the cradle member being operably engaged with the shaft member and configured to be rotatable by the shaft member between the valve closed position and the valve open position about an axis defined by the shaft member.

4. A drain valve according to claim 1, further comprising an outlet port seal operably engaged with the housing and extending about the outlet port, the outlet port seal being configured to be capable of operably engaging the sealing member to as to form a substantially fluid-tight sealing engagement therewith.

5. A drain valve according to claim 1, further comprising a directing element configured to engage the sealing member, as the sealing member is moved by the cradle member toward the valve closed position, so as to direct the sealing member toward the outlet port.

6. A drain valve according to claim 5, wherein the cradle member defines a slot configured to receive the directing element, as the cradle member moves the sealing member toward the valve closed position, so as to allow the directing element to engage the sealing member.

7. A drain valve according to claim 1, wherein the sealing member is configured as a sphere and the cradle member is configured to retain the spherical sealing member therein as the cradle member is moved between the valve open position and the valve closed position.

8. A drain valve according to claim 1, further comprising an anti-backflow device operably engaged with the at least one of the outlet port and the outlet channel, and adapted to prevent fluid from the house drain into the housing.

9. A drain valve according to claim 1, wherein the sealing member is comprised of at least one of an abrasion-resistant material, non-stick material, a buoyant material, and combinations thereof.

10. A drain valve according to claim 1, wherein at least one of the inlet channel and the outlet channel includes a threaded end.

11. A washing appliance according to claim 1, wherein the sealing member is comprised of at least one of an abrasion-resistant material, non-stick material, a buoyant material, and combinations thereof.

12. A washing appliance according to claim 1, wherein at least one of the inlet channel and the outlet channel includes a threaded end.

13. A drain valve according to claim 1, wherein the cradle member defines an opening for receiving the sealing member therein and at least partially surrounding the sealing member.

14. A washing appliance adapted to communicate with a house drain, the house drain being adapted to receive a fluid from the washing appliance, the washing appliance comprising:
   a washing compartment in communication with a drain channel extending toward the house drain; and
   a drain valve fluidly disposed along the drain channel between the washing compartment and the house drain, the drain valve comprising:

a housing adapted to receive the fluid through an inlet channel and to channel the fluid toward an outlet channel, and the outlet channel extending from an outlet port defined by the housing;

a sealing member disposed within the housing, the sealing member being configured to be capable of forming a sealing engagement with the outlet port; and a cradle member disposed within the housing and configured to receive and partially constrain freedom of movement of the sealing member, the cradle member being further configured to be rotatable within the housing between a valve closed position, where the sealing member is moved by the cradle member to a position such that fluid flow toward the outlet channel urges the sealing member into sealing engagement with the outlet port to close the drain valve, and a valve open position, where the sealing member is moved by the cradle member away from, and out of sealing engagement with, the outlet port such that fluid flow is allowed between the inlet channel and the outlet channel, through the housing, without the sealing member engaging the outlet port.

15. A washing appliance according to claim 14, wherein the outlet port is defined by a horizontally-disposed surface of the housing the sealing member is configured to be buoyant, and the cradle member is configured such that, in the valve closed position, the sealing member is disposed below the outlet port such that fluid flow toward the outlet channel buoys the sealing member into sealing engagement with the outlet port to close the drain valve and, in the valve open position, the sealing member is not disposed below the outlet port such that fluid flow is allowed between the inlet channel and the outlet channel through the housing.

16. A washing appliance according to claim 14, further comprising a shaft member extending into the housing and configured to be rotated by an actuator operably engaged therewith, the cradle member being operably engaged with the shaft member and configured to be rotatable by the shaft member between the valve closed position and the valve open position about an axis defined by the shaft member.

17. A washing appliance according to claim 14, further comprising an outlet port seal operably engaged with the housing and extending about the outlet port, the outlet port seal being configured to be capable of operably engaging the sealing member to as to form a substantially fluid-tight sealing engagement therewith.

18. A washing appliance according to claim 14, further comprising a directing element configured to engage the sealing member, as the sealing member is moved by the cradle member toward the valve closed position, so as to direct the sealing member toward the outlet port.

19. A washing appliance according to claim 18, wherein the cradle member defines a slot configured to receive the directing element, as the cradle member moves the sealing member toward the valve closed position, so as to allow the directing element to engage the sealing member.

20. A washing appliance according to claim 14, wherein the sealing member is configured as a sphere and the cradle member is configured to retain the spherical sealing member therein as the cradle member is moved between the valve open position and the valve closed position.

21. A washing appliance according to claim 14, further comprising an anti-backflow device operably engaged with the at least one of the outlet port and the outlet channel, and adapted to prevent fluid from the house drain into the housing.

22. A washing appliance according to claim 14, further comprising a circulation pump, the washing appliance being further configured such that, when the circulation pump is operating to circulate fluid through the washing compartment, the valve member is configured such that the cradle member is rotated to the valve closed position.

23. A method of controlling drainage from a washing appliance, comprising:

receiving a fluid through an inlet channel extending into a housing of a drain valve, the drain valve being fluidly disposed along a drain channel between a drain pump and a house drain, and channeling the fluid toward an outlet channel extending from an outlet port defined by the housing; and rotating a cradle member, the cradle member disposed within the housing and configured to receive and partially constrain freedom of movement of a sealing member configured to be capable of forming a sealing engagement with the outlet port, between a valve closed position, where the sealing member is moved by the cradle member to a position such that fluid flow toward the outlet channel urges the sealing member into sealing engagement with the outlet port to close the drain valve, and a valve open position, where the sealing member is moved by the cradle member away from, and out of sealing engagement with, the outlet port such that fluid flow is allowed between the inlet channel and the outlet channel, through the housing, without the sealing member engaging the outlet port.

24. A method according to claim 23, wherein the outlet port is defined by a horizontally-disposed surface of the housing and the sealing member is configured to be buoyant, and rotating the cradle member further comprises rotating the cradle member between the valve open position and the valve closed position such that, in the valve closed position, the sealing member is disposed below the outlet port such that fluid flow toward the outlet channel buoys the sealing member into sealing engagement with the outlet port to close the drain valve and, in the valve open position, the sealing member is not disposed below the outlet port such that fluid flow is allowed between the inlet channel and the outlet channel through the housing.

25. A method according to claim 23, wherein rotating the cradle member further comprises rotating the cradle member between the valve open position and the valve closed position with a shaft member operably engaged therewith, the shaft member extending into the housing and configured to be rotated by an actuator operably engaged therewith such that the cradle member rotates about an axis defined by the shaft member.

26. A method according to claim 23, further comprising directing the sealing member toward the outlet port with a directing element configured to engage the sealing member, as the sealing member is moved by the cradle member toward the valve closed position.

27. A method according to claim 26, wherein directing the sealing member toward the outlet port further comprises receiving the directing element through a slot defined by the cradle member, as the cradle member moves the sealing member toward the valve closed position, so as to allow the directing element to engage the sealing member.

28. A method according to claim 23, further comprising preventing fluid flow from the house drain into the housing with an anti-backflow device operably engaged with the at least one of the outlet port and the outlet channel.

29. A method according to claim 23, wherein the washing appliance further comprises a circulation pump, and the method further comprises rotating the cradle member to the valve closed position when the circulation pump is operating to circulate fluid.

* * * * *